United States Patent
Kishimoto et al.

(10) Patent No.: US 11,156,724 B2
(45) Date of Patent: Oct. 26, 2021

(54) SYSTEM AND METHOD FOR CALIBRATING INTER-FREQUENCY HARDWARE BIAS IN RTK POSITIONING USING ERROR CORRECTION INFORMATION

(71) Applicant: Magellan Systems Japan, Inc., Hyogo (JP)

(72) Inventors: Nobuhiro Kishimoto, Hyogo (JP); Toshinobu Nagamatsu, Hyogo (JP); Takehiro Ohnishi, Hyogo (JP)

(73) Assignee: Magellan Systems Japan, Inc., Hyogo (JP)

( * ) Notice: Subject to any disclaimer, the term of this patent is extended or adjusted under 35 U.S.C. 154(b) by 126 days.

(21) Appl. No.: 16/677,299

(22) Filed: Nov. 7, 2019

(65) Prior Publication Data
US 2021/0141098 A1 May 13, 2021

(51) Int. Cl.
*G01S 19/44* (2010.01)
*G01S 19/23* (2010.01)
*G01S 19/40* (2010.01)

(52) U.S. Cl.
CPC ............ *G01S 19/44* (2013.01); *G01S 19/235* (2013.01); *G01S 19/40* (2013.01)

(58) Field of Classification Search
CPC ....... G01S 19/071; G01S 19/235; G01S 19/43
See application file for complete search history.

(56) References Cited

U.S. PATENT DOCUMENTS 9,958,550 B2   5/2018   Chen et al.
10,107,917 B2  10/2018  Huang
(Continued)

OTHER PUBLICATIONS

A. Boriskin et al., Algorithms to Calibrate and Compensate for GLONASS Biases in GNSS RTK Receivers Working with 3rd Party Networks, Proceedings of the 21st International Technical Meeting of the Satellite Division of The Institute of Navigation (ION GNSS 2008), p. 376-384, Sep. 2008 (Year: 2008).*

(Continued)

*Primary Examiner* — Bernarr E Gregory
*Assistant Examiner* — Fred H Mull
(74) *Attorney, Agent, or Firm* — Beyer Law Group LLP

(57) ABSTRACT

In RTK positioning, a calibration memory stores calibration information for combinations of GNSS receivers. A memory processor retrieves the calibration information for a selected combination of a first GNSS receiver for a base station and a second GNSS receiver for a rover from the calibration memory. A calibration apparatus, by communicating with the rover and the memory processor, receives a first correction signal associated with the first GNSS receiver, obtains the calibration information and modifies the first correction signal therewith to generate a modified correction signal calibrated for the second GNSS receiver with respect to the first GNSS receiver, and transmits the modified correction signal to the rover. The rover performs the RTK positioning with respect to a known GNSS receiver of the base station using the modified correction signal, thereby automatically achieving the frequency-dependent hardware bias calibration for the second GNSS receiver with respect to the first GNSS receiver.

24 Claims, 10 Drawing Sheets

(56) References Cited

U.S. PATENT DOCUMENTS

2009/0184869 A1 7/2009 Talbot et al.
2017/0269227 A1 9/2017 Dai et al.

OTHER PUBLICATIONS

L. Wanninger, Carrier-phase inter-frequency biases of GLONASS receivers, J Geod, vol. 86, p. 139-148, 2012 (Year: 2012).*

Boriskin et al., "Algorithms to Calibrate and Compensate for GLONASS Biases in GNSS RTK Receivers Working with $3^{rd}$ Party Networks", GNSS 2008—Proceedings of the $21^{st}$ International Technical Meeting of the Satellite Division of the Institute of Navigation, Sep. 19, 2008, p. 376-384.

Håkansson et al., "Review of code and phase biases in multi-GNSS positioning", GPS (Conference on Outdoor Advertising Research), vol. 21, No. 3, Oct. 21, 2016, pp. 849-860.

International Search Report for International Application No. PCT/IB2020/059827 dated Feb. 5, 2021.

Written Opinion for International Application No. PCT/IB2020/059827 dated Feb. 5, 2021.

Yamada et al. "Evaluation of Positioning Performance for RTK-GPS/GLONASS with Calibrated Inter-channel Hardware Biases", Japanese Institute of Navigation, p. 103-110, Oct. 28, 2010.

Boriskin et al. "The RTCM Multiple Signal Messages: A New Step in GNSS Data Standardization", Proceedings of the 25th International Technical Meeting of the Satellite Division of the Institute of Navigation, Sep. 2012.

Yamada et al. "Calibration of Interchannel Bias in GLONASS Signals Journal of Institute of Electronics, Information and Communication Engineers" vol. J96-B No. 7, pp. 793-801, Jul. 1, 2013.

* cited by examiner

| Signal | Notation | Signal Frequency Range, MHz |
|---|---|---|
| GLONASS L1 | G1 | 1593 ~ 1610 |
| BeiDou B1-2 | B1-2 | 1580 ~ 1600 |
| GPS L1, Galileo E1, QZSS L1 | L1 | 1563 ~ 1587 |
| BeiDou B1 | B1 | 1551 ~ 1571 |
| Galileo E6, QZSS LEX | E6 | 1259 ~ 1299 |
| BeiDou B3 | B3 | 1259 ~ 1279 |
| GLONASS L2 | G2 | 1238 ~ 1254 |
| GPS L2, QZSS L2 | L2 | 1218 ~ 1238 |
| BeiDou B2 | B2 | 1197 ~ 1217 |
| GLONASS L3 | G3 | 1191 ~ 1211 |
| Galileo E5 | E5 | 1167 ~ 1217 |
| GPS L5, QZSS L5 | L5 | 1164 ~ 1188 |

FIG. 2

| Base Station-Side GNSS Receivers (1st GNSS Receivers) | Rover-Side GNSS Receiver ID #1 (2nd GNSS Receiver) | Rover-Side GNSS Receiver ID #2 (2nd GNSS Receiver) |
|---|---|---|
| ID #1 (Make, Model, Version etc.) | Calibration Information Set (1-1) | Calibration Information Set (2-1) |
| ID #2 | Calibration Information Set (2-1) | Calibration Information Set (2-2) |
| ID #3 | Calibration Information Set (3-1) | Calibration Information Set (3-2) |
| ID #4 | Calibration Information Set (4-1) | Calibration Information Set (4-2) |
| ⋯ | ⋯ | ⋯ |

FIG. 4

SYSTEM AND METHOD FOR CALIBRATING INTER-FREQUENCY HARDWARE BIAS IN RTK POSITIONING USING ERROR CORRECTION INFORMATION

BACKGROUND OF THE INVENTION

1. Field of the Invention

The present invention relates to calibration of inter-frequency (or inter-channel) hardware bias in Real Time Kinematic (RTK) positioning performed by GNSS receivers. More specifically, the present invention relates to a system and method for calibrating inter-frequency hardware bias in RTK positioning using error correction information, where the GNSS receivers in communication with each other are of different makes, types, and/or models.

2. Description of the Related Art

Global Navigation Satellite Systems (GNSS) available today include United States Global Positioning System (GPS), Russian Global Orbiting Navigation Satellite System (GLONASS), European Union's Galileo, China's BeiDou Satellite Navigation System (BDS, formerly known as Compass), and Japanese Quasi-Zenith Satellite System (QZSS).

Relative positioning techniques such as Real Time Kinematic (RTK) positioning employ Differential GNSS (DGNSS) technique to obtain the precise position (coordinates) of a GNSS receiver in a rover using a base station (or a reference station) at a known position. In typical RTK, respective GNSS signals from two GNSS satellites are received by two GNSS receivers (for example, in a base station and a rover), and four pseudo ranges are measured: a first pseudo range $\rho_B^{S1}(=\lambda\Phi_B^{S1})$ from a first satellite to the base station, a second pseudo range $\rho_R^{S1}(=\lambda\Phi_R^{S1})$ from the first satellite to the rover, a third pseudo range $\rho_R^{S2}(=\lambda\Phi_R^{S2})$ from a second satellite to the base station, and a fourth pseudo range $\rho_R^{S2}(=\lambda\Phi_R^{S2})$ from the second satellite to the rover. The pseudo ranges from the first and second GNSS satellites are also expressed as a product of a wavelength $\lambda$ and a phase $\Phi$ (including integer ambiguity N) of the GNSS signal observed at the respective GNSS receivers as denoted in the parentheses.

By taking a first difference between the receivers with respect to the same satellites, observation errors such as ionospheric signal delay, tropospheric signal delay, satellite clock errors, and inter-frequency bias between the satellites are eliminated, assuming the GNSS receivers' hardware and circuit delay are substantially the same. By further taking a double difference which is a difference between the first differences with respect the two different GNSS satellites, other errors such as receiver clock errors and/or receiver hardware bias can also be eliminated, if the signal frequency (i.e., the wavelength) of the GNSS signals from the two GNSS satellites are the same, for example, as is in the case of GPS satellites.

However, in such a satellite system as GLONASS which employs Frequency Division Multiple Access (FDMA), each satellite has a GNSS signal of its own (i.e., different) frequency even in the same frequency range such as L1 or L2. In such a case, since receiver circuit responses are frequency-dependent, the double difference in the same frequency band between two GLONASS satellites still includes the first difference of the receiver clock errors. This remaining first difference of the receiver clock errors adversely affects the ambiguity resolution such that the integer ambiguity N may not be fixed.

When GLONASS satellite signals are received by a GNSS receiver, each of GLONASS satellite signals is processed with a respective frequency-dependent circuit delay, and thus an inter-frequency bias in a measured value of signal phase (as well as that of the measured code) is observed at the GNSS receiver. Typically, GNSS receivers of the same make and the same type, model, or version (i.e., the same hardware structure) have substantially the same amount of frequency-dependent circuit delay. Thus, such an inter-frequency bias (frequency-dependent hardware bias) between the GNSS receivers can be eliminated by taking a first difference between the receivers. However, when the GNSS receivers are of different makes, types, models, and/or version (i.e., having different hardware structures), the inter-frequency bias still remains after taking the first difference.

Accordingly, in order to remove such an inter-frequency bias between GNSS receivers of different make/type/model/version, the rover-side receiver may be provided with a calibration table or the like such that the rover-side receiver performs a calibration process necessary to use GLONASS satellite signals for RTK positioning. For example, such a calibration table may contain parameters for a circuit delay for each frequency. If the circuit delay is approximated by a linear function of frequency, the calibration table may contain coefficients corresponding to gradient of such a frequency-dependent linear function. Certain types of GNSS receivers are also provided with self-calibration functionality in which the GNSS receivers perform calibration before starting RTK positioning.

BRIEF DESCRIPTION OF THE INVENTION

When RTK positioning is performed with two GNSS receivers in a base station and a rover, and if the GNSS receivers may be of different makes or different types/models/versions, a manufacture of rover-side receivers may need to provide the rover-side receiver with a calibration table or the like in order to eliminate the inter-frequency bias with respect to a base station-side receiver, as mentioned above. This allows the rover-side receiver to perform the RTK positioning with GLONASS signals by removing the inter-frequency bias with respect to the base station-side receiver which is found in the calibration table in the rover. However, such a calibration table has to be generated in advance by measuring a circuit delay (i.e., a calibration amount) for respective frequencies for each GNSS signal receiver (of respective make/type/model/version) expected to be used in the base station. Thus, there may be such a situation in which the make or type/model/version of the GNSS receiver actually installed in the base station is not in the calibration table (i.e., the base station has an unknown GNSS receiver therein), especially when the rover-side receiver is connected to a new base station or when a new type/model/version of GNSS receivers become available and the base stations have been updated with the newer receivers.

Thus, in order to ensure that rovers are able to properly perform RTK positioning with a given base station, it is necessary for a manufacturer of the rovers to be aware of newly developed or newer versions of GNSS receivers, conduct new measurements for the frequency-dependent circuit delay of such new GNSS receivers, and promptly update firmware or a calibration table in the rover-side receivers. This would place a significant burden on the manufactures of rovers and GNSS receivers therein. In addition, even in such rover-side receivers that have a self-calibration function, the RTK positioning cannot be performed unless and until such a calibration process is completed with respect to the new GNSS receiver of unknown make/type/model/version in the base station, and the rover-side receiver becomes ready for the RTK positioning. This would undermine timely RTK positioning and any subsequent processes or works depending on the result of the RTK positioning.

Accordingly, embodiments of the present invention provide a system and a method for allowing a rover-side GNSS receiver to perform RTK positioning using GLONASS signals without updating the firmware or calibration table even if a base station includes an unknown GNSS receiver of a new make, model, type, and/or version for which the rover-side GNSS receiver does not have information.

In accordance with one embodiment of the present invention, a system generates a correction signal for RTK positioning with a frequency-dependent hardware bias calibration between a base station and a rover. The system includes a calibration memory, a memory processor, and a calibration apparatus. The calibration memory stores a set of calibration information (calibration parameters) for base-rover combinations between a plurality of GNSS receivers for the base station and at least one GNSS receiver for the rover. The memory processor is configured to retrieve the calibration information for a selected base-rover combination of a first GNSS receiver for the base station and a second GNSS receiver for the rover from the calibration memory. The calibration apparatus is in communication with the rover and the memory processor. The calibration apparatus is configured to (i) receive a first correction signal including first error correction information associated with the first GNSS receiver, (ii) obtain the calibration information selected by the memory processor based on the first correction signal, (iii) modify the first error correction information with the selected calibration information to generate a modified correction signal including modified error correction information calibrated for the second GNSS receiver with respect to the first GNSS receiver, and (iv) transmit the modified correction signal to the rover. The rover performs the RTK positioning with respect to a known GNSS receiver for the base station using the modified correction signal, thereby automatically achieving the frequency-dependent hardware bias calibration for the second GNSS receiver with respect to the first GNSS receiver.

In accordance with one embodiment of the present invention, at least one of a make, type, model, and firmware version of the first GNSS receiver may be different from that of the known GNSS receiver for the base station, and the second GNSS receiver does not recognize the first GNSS receiver. The modified error correction information may include (a) identification information of the known GNSS receiver, and (b) modified parameter values which are configured to produce correct frequency-dependent hardware bias calibration with respect to the first GNSS receiver when used by the second GNSS receiver in a calibration process with respect to the known GNSS receiver.

In accordance with one embodiment of the present invention, the first GNSS receiver is one of a plurality of known GNSS receivers recognized by the second GNSS receiver, while the first GNSS receiver has hardware characteristics unknown to the second GNSS receiver. The modified error correction information may include (a) identification information of the first GNSS receiver having known hardware characteristics, and (b) modified parameter values which are configured to produce correct frequency-dependent hardware bias calibration with respect to the first GNSS receiver when used by the second GNSS receiver in a calibration process with respect to the first GNSS receiver having the known hardware characteristics. The hardware characteristics may depend on at least one of type, model, and firmware version of the first GNSS receiver.

In accordance with one embodiment of the present invention, the calibration memory, the memory processor, and the calibration apparatus are configured to be installed in a server which is in communication with the base station and the rover.

In accordance with another embodiment of the present invention, the calibration memory, the memory processor, and the calibration apparatus are configured to be installed in the base station.

In accordance with yet another embodiment of the present invention, the calibration memory and the memory processor are configured to be installed in a server which is in communication with the base station and the rover, while the calibration apparatus is configured to be coupled with the rover so as to communicate with the second GNSS receiver.

In accordance with one embodiment of the present invention, the first GNSS receiver and the second GNSS receiver respectively receive a plurality of GNSS signals including GLONASS signals. The set of calibration information (calibration parameters) may include at least one of (i) a calibration table of measured calibration values for the frequency-dependent hardware bias with respect to the base-rover combinations, and (ii) a set of calibration coefficients for linear approximation of the frequency-dependent hardware bias with respect to frequency numbers of GLONASS satellites.

In accordance with one embodiment of the present invention, the rover is configured to transmit identification information of the second GNSS receiver therein to the memory processor. The system may further include a database which is coupled with the memory processor and stores information of a plurality of GNSS receivers for the rover. The memory processor may further be configured to identify the second GNSS receiver from among the plurality of GNSS receivers for the rover in the database based on the identification information, thereby selecting the combination of the first GNSS receiver and the second GNSS receiver for the calibration memory.

In accordance with one embodiment of the present invention, the memory processor may further be configured to update the calibration memory with updated calibration information or calibration information for a new base-rover combination. The memory processor may further be configured to update the database with updated identification information for new GNSS receivers for the rover.

In another aspect of the invention provides a method for generating a correction signal for RTK positioning with a frequency-dependent hardware bias calibration between a base station having a first GNSS receiver and a rover having a second GNSS receiver. The method includes (a) storing a set of calibration information for base-rover combinations between a plurality of GNSS receivers for the base station and at least one GNSS receiver for the rover, (b) receiving a first correction signal including first error correction information associated with the first GNSS receiver, (c) selecting a base-rover combination of the first GNSS receiver for the base station and the second GNSS receiver for the rover based on the first correction signal, (d) retrieving the calibration information for the selected base-rover combination from the stored set of calibration information, (e) modifying the first error correction information with the retrieved calibration information into modified error correction information which is calibrated for the second GNSS receiver with respect to the first GNSS receiver, (f) generating a modified correction signal including the modified error correction information, (g) transmitting the modified correction signal to the second GNSS receiver in the rover, and (h) allowing the rover to perform the RTK positioning with respect to a known GNSS receiver for the base station using the modified correction signal, thereby automatically achieving the frequency-dependent hardware bias calibration for the second GNSS receiver in the rover with respect to the first GNSS receiver in the base station.

In accordance with one embodiment of the present invention, at least one of a make, type, model, and firmware version of the first GNSS receiver may be different from that of the known GNSS receiver, and the second GNSS receiver may not recognize the first GNSS receiver. The modified error correction information may include identification information of the known GNSS receiver, and modified parameter values which produce correct frequency-dependent hardware bias calibration with respect to the first GNSS receiver when used by the second GNSS receiver in a calibration process with respect to the known GNSS receiver.

In accordance with one embodiment of the present invention, the first GNSS receiver may be one of a plurality of known GNSS receivers recognized by the second GNSS receiver, while the first GNSS receiver having different hardware characteristics unknown to the second GNSS receiver. The modified error correction information may include identification information of the first GNSS receiver known to the second GNSS receiver, and modified parameter values. The modified parameter values are configured to produce correct frequency-dependent hardware bias calibration with respect to the first GNSS receiver having the different hardware characteristics unknown to the second GNSS receiver, when used by the second GNSS receiver in a calibration process with respect to the first GNSS receiver having the hardware characteristics known to the second GNSS receiver.

In accordance with one embodiment of the present invention, the hardware characteristics may depend on at least one of type, model, and firmware version of the first GNSS receiver.

In accordance with one embodiment of the present invention, the storing, the receiving, the selecting, the retrieving, the modifying, the generating, and the transmitting may be performed in a server which is in communication with the base station and the rover.

In accordance with another embodiment of the present invention, the storing, the receiving, the selecting, the retrieving, the modifying, the generating, and the transmitting may be performed in the base station.

In accordance with yet another embodiment of the present invention, the storing, the receiving, the selecting, and the retrieving may be performed in a server which is in communication with the base station and the rover. The method may further include transmitting the received first correction signal and the retrieved calibration information to the rover, while the modifying, the generating, and the transmitting may be performed in a calibration apparatus which is provided to the rover so as to communicate with the GNSS receiver in the rover.

In accordance with one embodiment of the present invention, the performing the RTK positioning may include receiving a plurality of GNSS signals including GLONASS signals.

In accordance with one embodiment of the present invention, the set of calibration information includes at least one of a calibration table and a set of calibration coefficients. The calibration table includes measured calibration values for the frequency-dependent hardware bias with respect to the base-rover combinations. The set of calibration coefficients are used for linear approximation of the frequency-dependent hardware bias with respect to frequency numbers of GLONASS satellites.

In accordance with one embodiment of the present invention, the method may further include (i) providing a database associated with the set of calibration information, the database storing information of a plurality of GNSS receivers for the rover, (j) receiving identification information of the second GNSS receiver from the rover, (k) identifying the second GNSS receiver from among the plurality of GNSS receivers or the rover in the database based on the identification information, thereby selecting the combination of the first GNSS receiver and the second GNSS receiver.

In accordance with one embodiment of the present invention, the method may further include updating the set of calibration information memory with updated calibration information or calibration information for a new base-rover combination. The method may further include updating the database with updated identification information for new GNSS receivers for the rover.

BRIEF DESCRIPTION OF THE DRAWINGS

The present invention is illustrated by way of example, and not by way of limitation, in the FIGS. of the accompanying drawings and in which like reference numerals refer to similar elements and in which:

FIG. 2 shows currently available GNSS signals and the frequency ranges thereof.

FIG. 4 is a diagram schematically illustrating an example of a calibration memory which stores calibration information in accordance with one embodiment of the present invention.

DETAILED DESCRIPTION OF EMBODIMENTS OF THE INVENTION

The embodiments of the present invention provide a system and a method for allowing a rover-side GNSS receiver to perform Real Time Kinematic (RTK) positioning using GLONASS signals without considering any frequency-dependent hardware bias, by incorporating hardware bias calibration information (mechanism and functionality) into a correction signal for the rover-side GNSS receiver. According to the embodiments of the present invention, the rover-side GNSS receiver does not have to update its firmware or calibration table even if a base station has an unknown GNSS receiver for which the rover-side GNSS receiver does not have hardware information such as make, model, type and/or version for determining frequency-dependent hardware bias (circuit delay).

Figure 1:
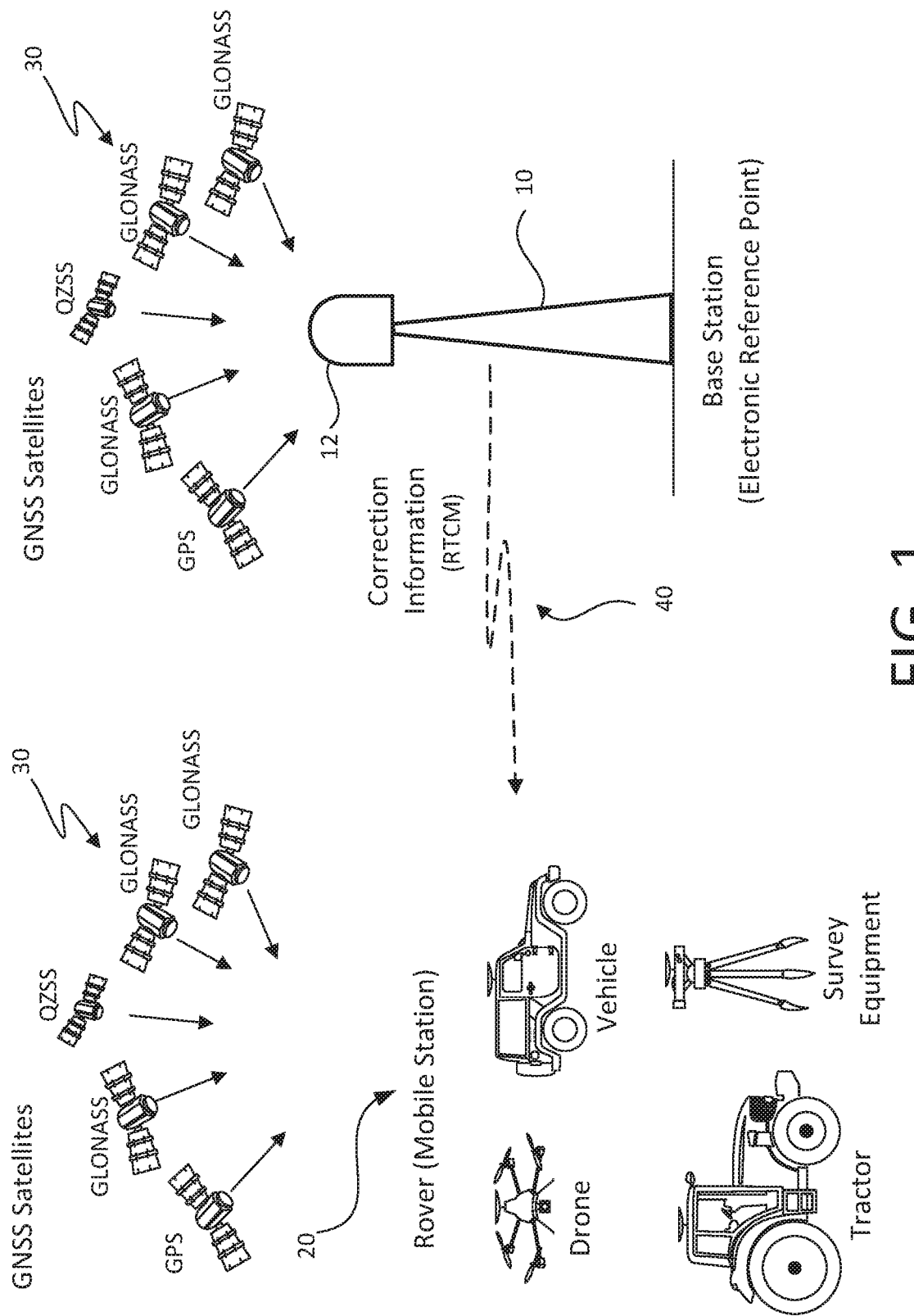
FIG. 1 is a schematic diagram illustrating an environment in which the embodiments of the present invention is implemented.

FIG. 1 schematically illustrates an environment in which the embodiments of the present invention is implemented. As shown in FIG. 1, RTK positioning using a base station 10 may be performed by a rover 20 (mobile station), both of which receive a plurality of GNSS signals from a plurality of GNSS satellites 30, including GLONASS satellites. FIG. 2 shows currently available GNSS signals and the frequency ranges thereof from various GNSS, including GLONASS. As mentioned above, each GLONASS satellite is assigned with a unique frequency in each frequency band. Thus, even in the same frequency band such as L1, each of the GLONASS satellites has a different frequency within the L1 band, resulting in a different circuit delay in a GNSS receiver receiving the same L1 band signals from a plurality of GLONASS satellites.

The base station 10 may be a reference station or an electronic reference point installed at a fixed location. The fixed location may be a permanent location or a temporary location. The base station 10 may also be a potable reference station used in different work sites as needed. It is assumed that, in the RTK positioning, the precise position (coordinates) of the base station 10 is known, or readily known. The base station 10 receives the GNSS signals via an antenna 12 thereof, and is capable of generating a conventional error correction signal 40 including error correction information such as pseudo-range correction (PRC) information to improve positioning accuracy. The PRC information created at the base station 10 is provided via communication links, such as a radio beacon, Networked Transport of RTCM via Internet Protocol (NTRIP), Digital Multimedia Broadcasting (DMB), Radio Date System (RDS), FM data Radio Channel (DARC), etc. For example, Radio Technical Commission for Maritime Services (RTCM) provides a transmission standard ("RTCM standard") that defines the data structure for differential correction information for a variety of differential correction applications.

The rover 20 may be a vehicle, a drone, a tractor, other survey equipment (GNSS user), and the like, which also receives the GNSS signals via an antenna thereof from the plurality of GNSS satellites 30. The rover 20 is capable of determining its position using the known, precise position of the base station 10 and other necessary error correction information as a relative position with respect to the position of the base station 10.

Figure 3:
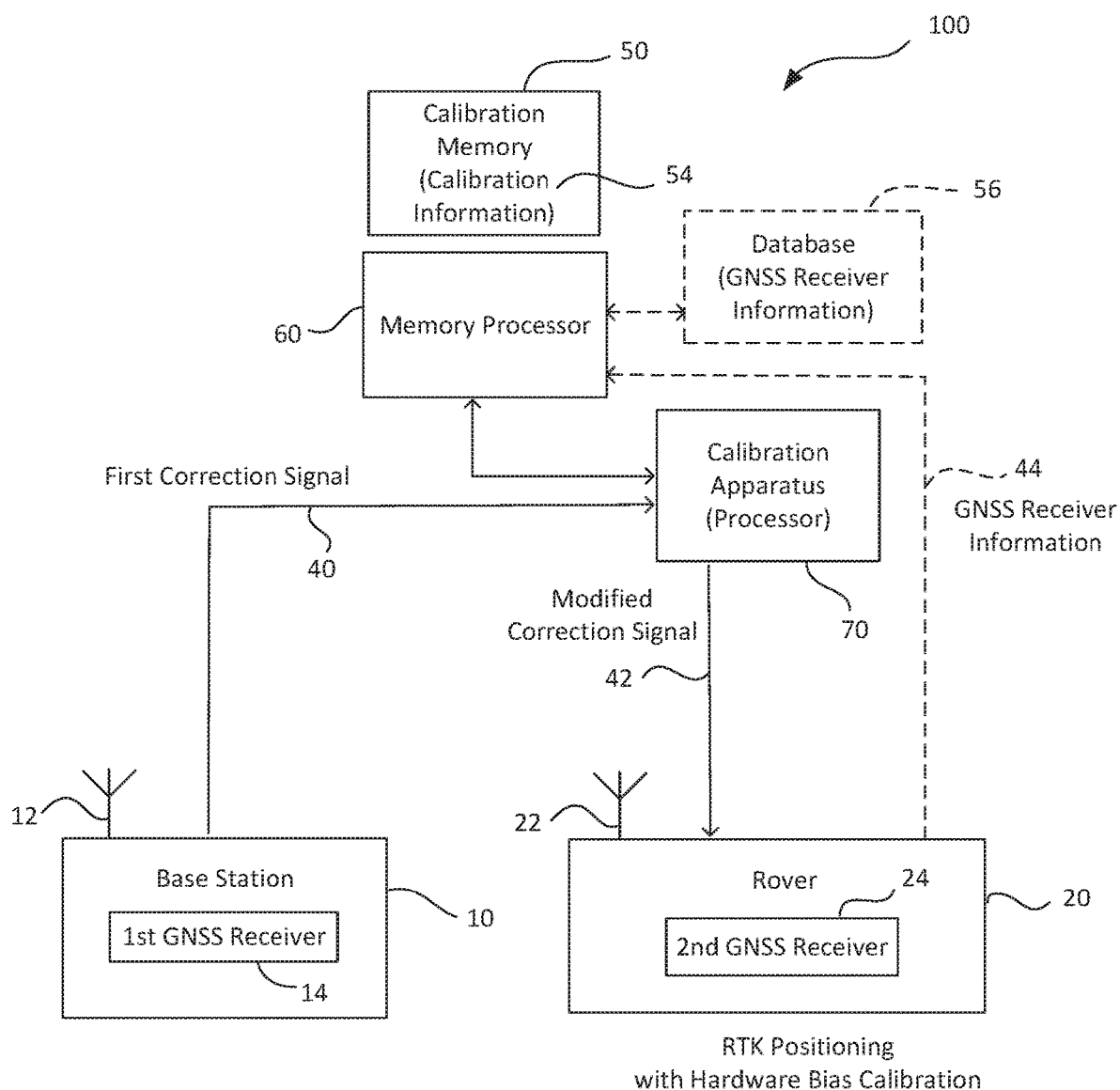
FIG. 3 is a diagram schematically illustrating a system for generating a correction signal for RTK positioning with a frequency-dependent hardware bias calibration between the base station and the rover in accordance with one embodiment of the present invention.

FIG. 3 schematically illustrates a system 100 for generating a correction signal for RTK positioning with a frequency-dependent hardware bias calibration between the base station 10 and the rover 20 in accordance with one embodiment of the present invention. The system 100 can also be considered as that for allowing the rover to perform RTK positioning with automatically calibrating a frequency-dependent hardware bias with respect to an unknown GNSS receiver in the base station. As shown in FIG. 3, the base station 10 includes a first antenna 12 and a first GNSS receiver 14, while the rover 20 includes a second antenna 22 and a second GNSS receiver 24. The system 100 includes a calibration memory 50, a memory processor 60, and a calibration apparatus (processor) 70. The system 100 may be installed in a server, in the base station, or in the server in part and in the rover in part, in accordance with its application. The system 100 may be implemented in a combination of hardware and software, and may also be implemented in part or in its entirety as non-transient computer readable media. The term "non-transient computer readable media" is used generally to refer to media such as main memory, secondary memory, removable storage, and storage devices, such as hard disks, flash memory, disk drive memory, CD-ROM and other forms of persistent memory and shall not be construed to cover transitory subject matter, such as carrier waves or signals.

The calibration memory 50 stores a set of calibration information (calibration parameters) for base-rover combinations between a plurality of GNSS receivers for the base station 10 and at least one second GNSS receiver for the rover 20. The plurality of GNSS receivers for the base station are possible GNSS servers implemented in the base station 10 as the first GNSS receiver 14. The at least one GNSS receiver for the rover 20 is at least one possible GNSS receiver implemented in the rover 20 as the second GNSS receiver 24. For example, if the system 100 is customized for a specific GNSS receiver for the rover, the calibration memory 50 may only include a set of the calibration information of the plurality of GNSS receivers for the base station to be used for the specific GNSS receiver of the rover.

As shown in FIG. 4, for example, the calibration memory 50 may store the calibration information in a form of a calibration table 52 containing a set of calibration information (calibration information) 54 for each of the base-rover combination Each of the GNSS receivers may be identified with a respective ID number specifying the make, model, type, and/or version etc. corresponding to the unique hardware characteristics, for example, circuit delay. A base-rover combination may be specified by a combination of a base station-side receiver ID # and a rover-side receiver ID #. The calibration information 54 may be calibration coefficients for a linear function of frequency if the frequency-dependent hardware bias for the circuit delay in the second GNSS receiver is approximated by such a linear function.

The memory processor 60 is configured to retrieve the calibration information 54 for a selected combination of the first GNSS receiver 14 for the base station 10 and the second GNSS receiver 24 for the rover 20 from the calibration memory 50. The memory processor 60 may further be configured to update the calibration memory 50 with updated calibration information, or with calibration information for a new base-rover combination when new GNSS receivers become available.

As shown in FIG. 3, the calibration apparatus 70 is in communication with the rover 20 and the memory processor 60. The calibration apparatus 70 may be implemented as a processor as a combination of hardware and software, or using computer readable media. The base station 10 generates and transmits a first correction signal 40 via a communication link such as a radio beacon, Networked Transport of RTCM via Internet Protocol (NTRIP), Digital Multimedia Broadcasting (DMB), Radio Date System (RDS), FM data Radio Channel (DARC), etc. as mentioned above. The first correction signal 40 may be a conventional error correction signal, for example, error correction signal using the RTCM standard or format. The first error correction signal 40 includes first error correction information associated with the first GNSS receiver 14, as mentioned above, as well as identification information of the first GNSS receiver 14.

The memory processor 60 selects, based on the identification information (GNSS receiver information) of the first GNSS receiver 14, the calibration information 54 for the specific combination of the first GNSS receiver 14 for the base-station 10 and the specific second GNSS receiver 24 for the rover 20. The memory processor 60 may obtain the GNSS receiver information from the first correction signal 40 received, or in communication with the calibration apparatus 70 which receives the first correction signal 40.

The calibration apparatus 70 receives the first correction signal 40 and obtains the calibration information 54 selected by the memory processor 60. The calibration apparatus 70 modifies the first error correction information in the first correction signal 40 with the selected calibration information 54 into modified error correction signal, and generates a modified correction signal 42 including the modified error correction information. The modified error correction information is calibrated for the second GNSS receiver 24 with respect to the first GNSS receiver 14 using the selected calibration information 54. The calibration apparatus 70 transmits the modified correction signal 42 to the rover 20 such that the modified correction signal 42 is provided to the second GNSS receiver 24.

The rover 20 performs, with the second GNSS receiver 24, the RTK positioning with respect to a known GNSS receiver for the base station 10 using the modified correction signal 42. A "known" GNSS receiver is a GNSS receiver known to the second GNSS receiver 24, which means that the second GNSS receiver 24 can identify the GNSS receiver with its frequency-dependent hardware characteristics (the circuit delay and/or the corresponding bias amount) such that the second GNSS receiver 24 is able to use GLONASS signals with proper hardware bias calibration in the RTK positioning. That is, using the modified correction signal 42 given by the calibration apparatus 70, instead of using the first error correction signal 40 generated by the base station 10 and/or an existing calibration table, if any, even if the first GNSS receiver 14 may be unknown to the second GNSS receiver 24, the rover 20 (the second GNSS receiver 24) automatically achieves the frequency-dependent hardware bias calibration with respect to the first GNSS receiver 14. That is, performing the RTK positioning with the frequency-dependent hardware bias calibration with respect to the known GNSS receiver using the modified calibration information (modified calibration parameters) yields the correct frequency-dependent hardware bias calibration for the second GNSS receiver 24 with respect to the unknown first GNSS receiver.

For example, at least one of the make, type, model, and firmware version of the first GNSS receiver 14 may be different from that of a GNSS receiver known to the second GNSS receiver 24, and thus the second GNSS receiver 24 may not recognize the first GNSS receiver 14. In other words, identification information of the first GNSS receiver 14 sent from the base station 10, for example, via the first correction signal 40 may not match any identification information for possible base station-side GNSS receivers maintained in the second GNSS receiver 24. This means that the second GNSS receiver 24 may not be able to perform, or properly perform, the hardware bias calibration with respect to the first GNSS receiver 14.

Accordingly, the modified error correction information in the modified correction signal 42 includes (a) identification information of a known GNSS receiver of the base station 10 which is recognizable to the second GNSS receiver 24, and (b) modified parameter values which are configured to produce correct frequency-dependent hardware bias calibration with respect to the first GNSS receiver 14 when used by the second GNSS receiver 24 in a calibration process with respect to the known GNSS receiver.

In accordance with one embodiment of the present invention, the system 100 may be customized to the rover 20 having a specific second GNSS receiver, as a specific application. In such a case, the identification information of a known GNSS receiver in the modified correction signal 42 may be that of the specific second GNSS receiver itself, such that the second GNSS receiver 24 in the rover 20 would determine as if the base station 10 has the first GNSS receiver 14 which is the same GNSS receiver as the second GNSS receiver 24. The calibration parameter values are modified accordingly such that when the second GNSS receiver 24 performs the frequency-dependent hardware bias calibration with respect to a GNSS receiver which is the same as the second GNSS receiver 24 using the modified parameter values, the calibration process would compensate the actual frequency-dependent hardware bias with respect to the first GNSS receiver 14 of the base station 10. For example, the modified correction signal 42 may be in a form the RTCM standard correction signal which is (virtually) sent from a (virtual) GNSS receiver which is the same as the second GNSS receiver 24 and includes the calibration parameters which have been replaced with the modified calibration parameters.

In addition, when the system 100 is customized to such a specific second GNSS receiver in the rover 20, the calibration table 52 in the calibration memory 50 can also be simplified to contain calibration information 54 of the plurality of base station-side GNSS receivers for the specific GNSS second receiver only. The memory processor 60 can retrieve the calibration parameter based on the identification information of the first GNSS receiver 14 indicated in the first correction signal 40 from the base station 10.

In another example, the first GNSS receiver 14 may be one of a plurality of known GNSS receivers recognized by the second GNSS receiver 24, but the first GNSS receiver 14 has hardware characteristics (for example, frequency-dependent circuit delay) unknown to the second GNSS receiver 24, or that which is different from what is previously known to the second GNSS receiver 24. Thus, the modified error correction information in the modified correction signal 42 may include (a) identification information of the first GNSS receiver 14 which has the hardware characteristics known to the second GNSS receiver 24, and (b) modified parameter values which are configured to produce correct frequency-dependent hardware bias calibration with respect to the first GNSS receiver 14 when used by the second GNSS receiver 24 in the calibration process with respect to the first GNSS receiver 14 having the known hardware characteristics. The hardware characteristics may depend on at least one of type, model, and firmware version of the first GNSS receiver. This implementation is useful, for example, when the first GNSS receiver 14 in the base station 10 has been updated with a newer models or versions but identified by the second GNSS receiver 24 as the same first GNSS receiver 14.

In accordance with one embodiment of the present invention, the system 100 may be further configured to manage a plurality of different GNSS receivers for the rover 20. In such a case, the rover 20 is also configured to transmit identification information of the second GNSS receiver 24 to the memory processor 60. For example, as shown in FIG. 3, the rover 20 may send GNSS receiver information 44 (or identification information) to the memory processor 60. Alternatively, the rover 20 (the second GNSS receiver 24) may transmit the GNSS receiver information 44 to the calibration apparatus 70, and then the calibration apparatus 70 may provide the identification information to the memory processor 60. In this example, as shown in FIG. 3, the system 100 further includes, as an option, a database 56 coupled with the memory processor 60. The database 56 stores information of a plurality of GNSS receivers for the rover 20. The memory processor 60 is further configured to identify the second GNSS receiver 24 in the rover 20 from among the plurality of GNSS receivers in the database 56 based on the identification information, and selects a specific combination of the first GNSS receiver 14 and the second GNSS receiver 24 so as to retrieve the corresponding calibration information 54 from the calibration memory 50.

The set of calibration information 54 may include at least one of (i) a calibration table of measured calibration values for the frequency-dependent hardware bias with respect to the base-rover combinations, and (ii) a set of calibration coefficients for linear approximation of the frequency-dependent hardware bias with respect to frequency numbers of GLONASS satellites.

When a new GNSS receiver or a new type/mode/version of an existing GNSS receiver becomes available to be installed in a base station, the contents of the calibration memory can be updated accordingly. Thus, the memory processor 60 may further be configured to update the calibration memory 50 with such updated calibration information, or with calibration information for a new base-rover combination. In addition, the memory processor 60 may also update the database 56 when one or more new GNSS receivers, or newer models/versions of the GNSS receiver for the rover 20 become available.

Figure 5:
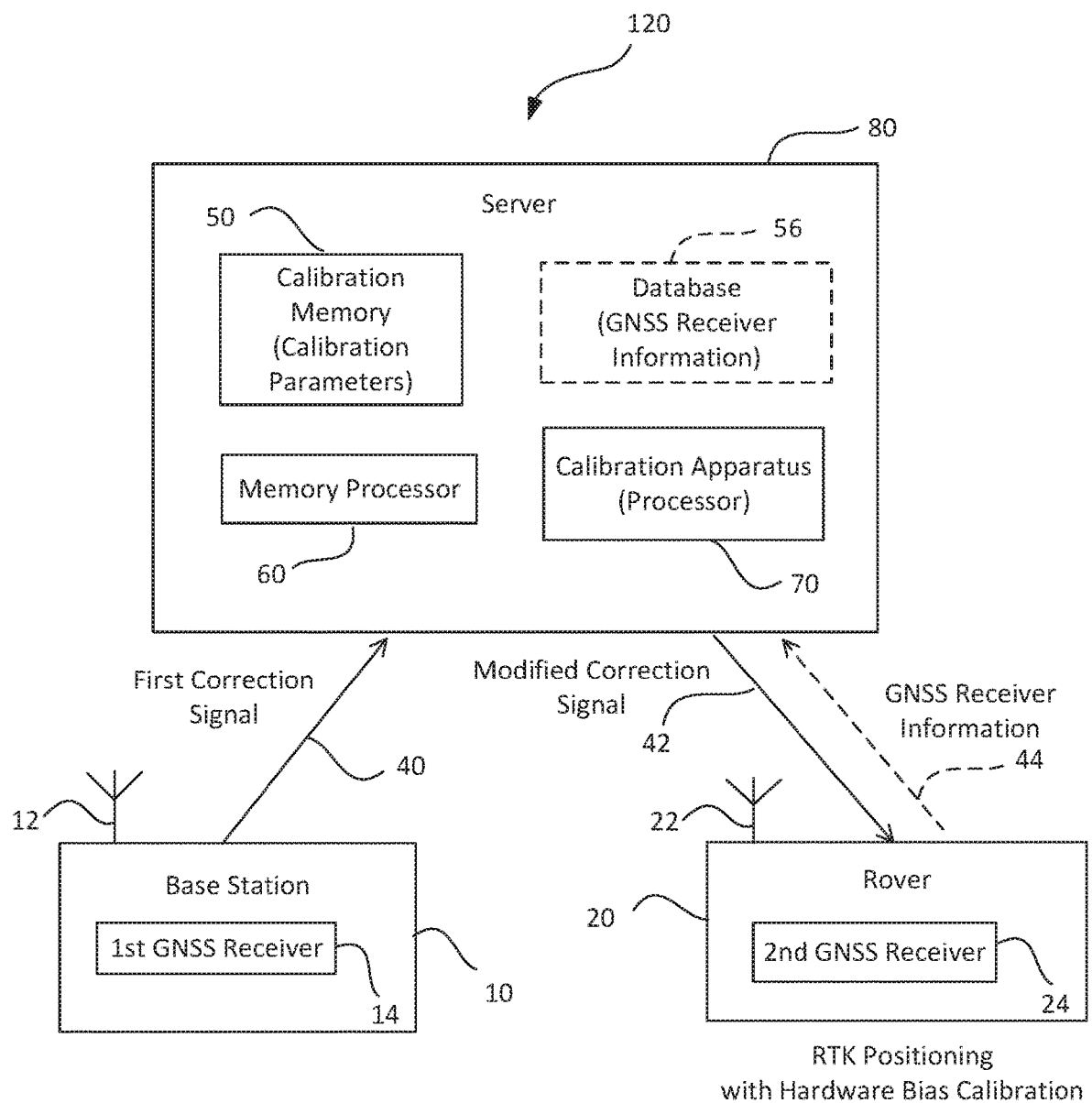
FIG. 5 is a diagram schematically illustrating the system implemented in a server, in accordance with one embodiment of the present invention.

FIG. 5 schematically illustrates a system 120 in accordance with one embodiment of the present invention, in which the system 120 is implemented in a server 80. In this and following embodiments, the same elements are denoted as the same reference numerals, and the detailed explanations are omitted unless functions or implementations are different as specifically noted. In this embodiment, the calibration memory 50, the memory processor 60, and the calibration apparatus 70 are configured to be installed in the server 80 which is in communication with the base station 10 and the rover 20. In addition, similarly to the previous embodiment, the system 120 may further include the database 56 such that a plurality of different makes, types, models, and/or versions of the second GNSS receiver 24 in the rover 20 can be managed.

As shown in FIG. 5, the first correction signal 40 is sent from the base station 10 to the server 80, and the modified correction signal 42 is sent from the server 80 to the rover 20. In addition, the GNSS receiver information 44 (such as identification information of the second GNSS receiver 24) is sent from the rover 20 to the server 80 when the system 120 is capable of handling a plurality of different second GNSS receivers 24. Since the entire system 120 is implemented in the server 80, neither the base station 10 nor the rover 20 needs to be changed in order to perform the RTK positioning using the GLONASS signals with the frequency-dependent hardware bias calibration, even if the base station 10 has the first GNSS receiver 14 unknown to the second GNSS receiver 24 of the rover 20.

In this implementation, information on all of the GNSS receivers which are possibly used for the base station-side GNSS receiver (the first GNSS receiver 14) and/or the rover-side GNSS receiver (the second GNSS receiver 24), such as makes, types, models, and firmware versions, may be registered to the server 80, and stored in the calibration memory 50 in the server 80 with corresponding calibration information 54. The server 80 may obtain the information on the first GNSS receiver from the base station 10 beforehand by receiving the first correction signal 40 from the base station 10.

In addition, the server 80 may further include an interface (not shown) for receiving/transmitting the first correction signal 40, the modified correction signal 42, and the GNSS receiver information 44, in communication with the base station 10, the rover 20, the memory processor 60, and the calibration apparatus 70. Alternatively such an interface may be integrated with the calibration apparatus 70. Alternatively, or in addition, the memory processor 60 may receive the first correction signal 40 and/or the GNSS receiver information 44 directly, so as to retrieve the calibration information 54 from the calibration memory 50 and provide to the calibration apparatus 70.

Figure 6:
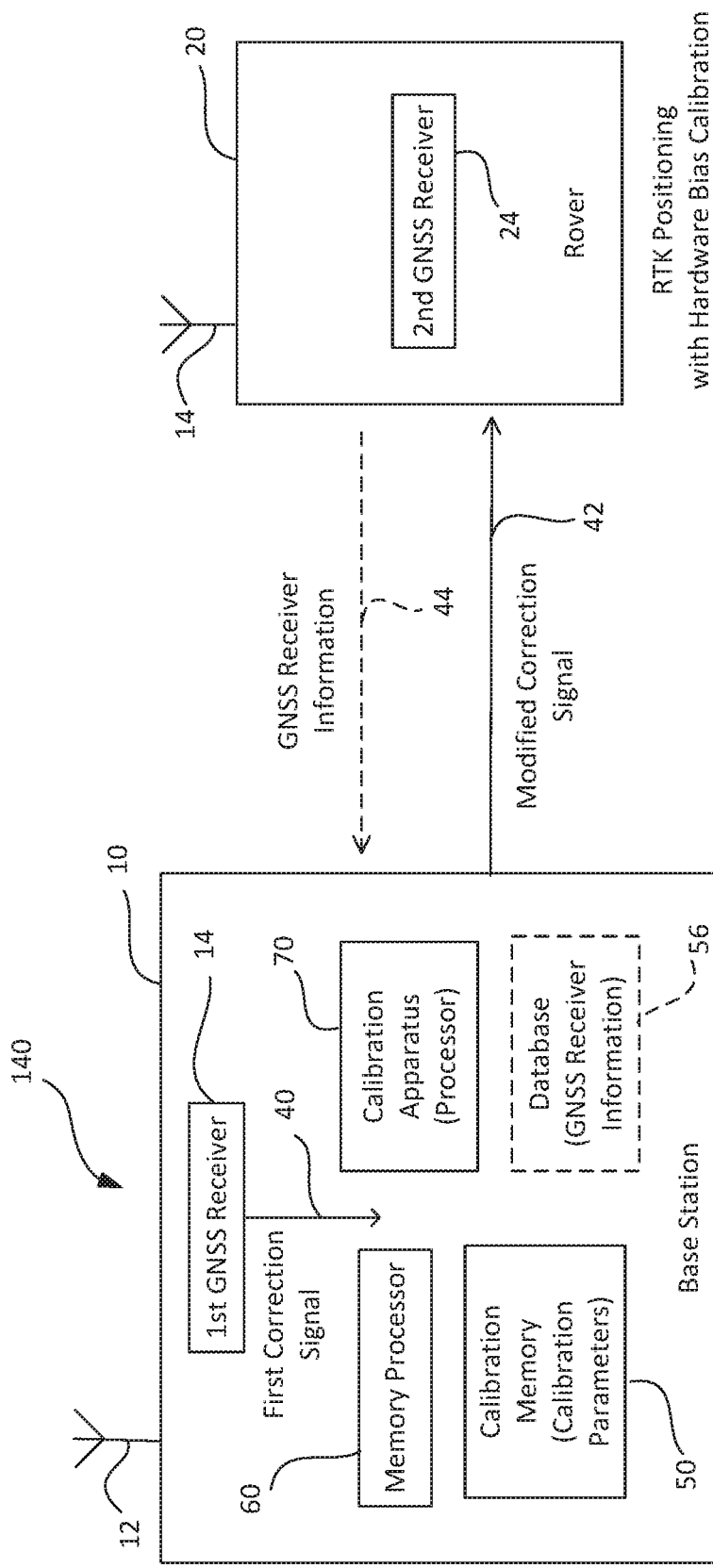
FIG. 6 is a diagram schematically illustrating the system implemented in the base station in accordance with another embodiment of the present invention.

FIG. 6 schematically illustrates a system 140 in accordance with another embodiment of the present invention, in which the system 140 is implemented in the base station 10 by configuring the calibration memory 50, the memory processor 60, and the calibration apparatus 70 to be installed in the base station 10. In addition, similarly to the previous embodiments, the system 140 may further include the database 56 such that a plurality of different makes, types, models, and/or versions for the second GNSS receiver 24 in the rover 20 can be managed.

In this implementation, information on all of the GNSS receivers which are possibly used for the base station-side GNSS receiver (the first GNSS receiver 14) and/or the rover-side GNSS receiver (the second GNSS receiver 24), such as makes, types, models, and firmware versions, may be registered to the base station 10, and stored in the calibration memory 50 in the base station 10 with corresponding calibration information 54 for each base-rover combination. The calibration information 54 can be updated as needed when new calibration information becomes available though measurement of new GNSS receivers, as described above. In addition, the database 56 can also be updated as needed when new GNSS receivers for the rover become available, as described above.

When RTK positioning is performed, the base station 10 may obtain the information on the second GNSS receiver 24 (GNSS receiver information) from the rover 20 if the base station 10 has not identified the GNSS receiver 24 in the rover 20. If the system 140 is customized to a specific rover-side GNSS receiver, this identification process may be omitted.

In this embodiment, based on the identification information of the first GNSS receiver 14, which may be contained in the first correction signal 40 generated by the first GNSS receiver 14, the calibration apparatus 70 modifies the first error correction information in the first correction signal 40 with the calibration information for the second GNSS receiver 24 which is retrieved from the calibration memory 50, and generates the modified correction signal 42. Instead of sending the first correction signal 40, the base station 10 sends the modified correction signal 42 to the rover 20. For example, the modified correction signal 42 may be that of the RTCM signal having the GNSS receiver identification indicating the first GNSS receiver 14 with the modified calibration information. The rover 20 performs the RTK positioning using the modified correction signal 42.

Since the entire system 140 is implemented in the base station 10, the rover 20 does not need to be changed in order to perform the RTK positioning using the GLONASS signals with the frequency-dependent hardware bias calibration, even if the base station 10 has the first GNSS receiver 14 unknown to the second GNSS receiver 24, or if the first GNSS receiver 14 has unknown hardware characteristics.

Figure 7:
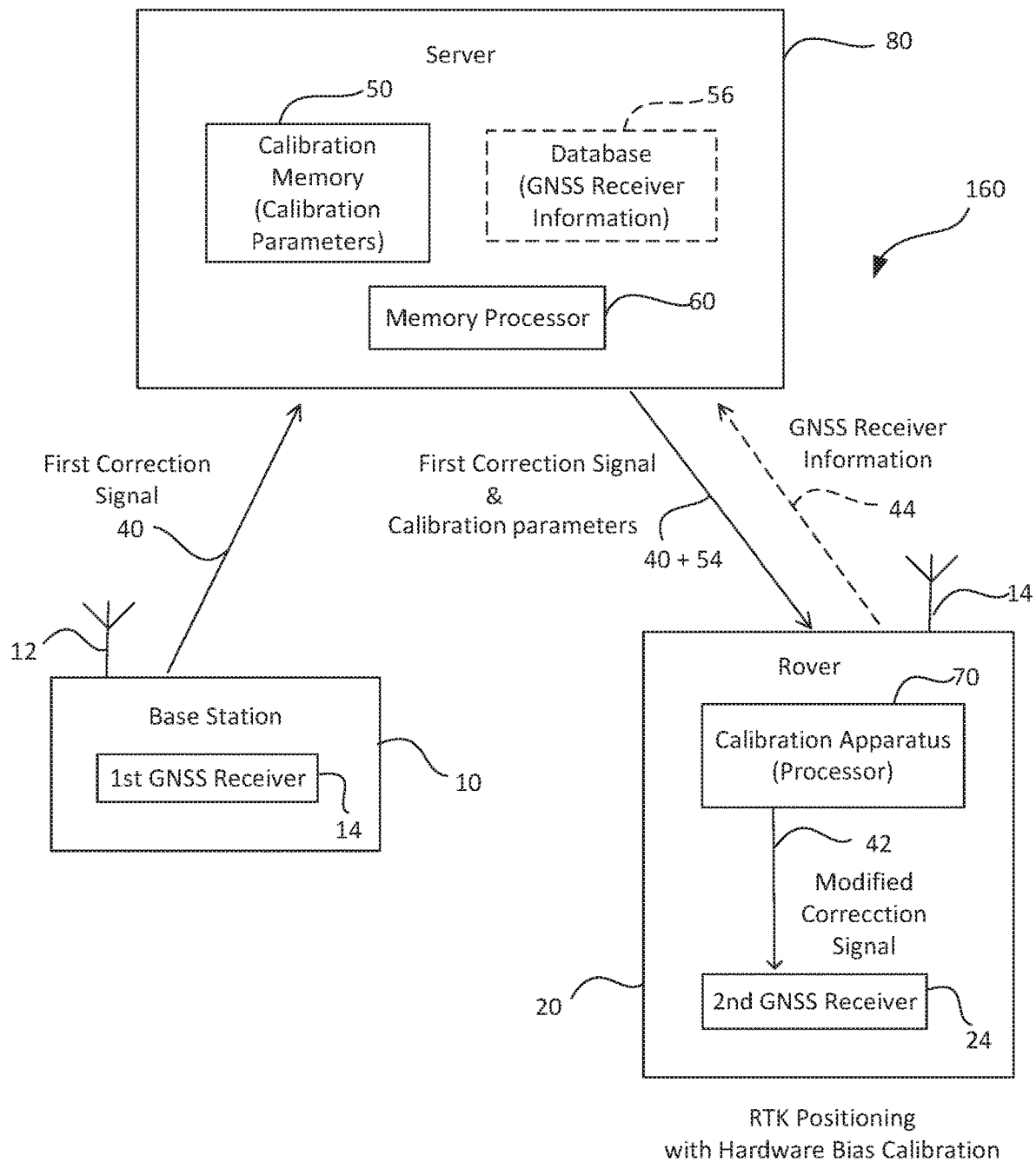
FIG. 7 is a diagram schematically illustrating the system implemented in part in the server and in part in the rover, in accordance with one embodiment of the present invention.

FIG. 7 schematically illustrates a system 160 in accordance with another embodiment of the present invention, in which the system 160 is implemented in part in the server 80 and in part in the rover 20. In this embodiment, the calibration memory 50 and the memory processor 60 are configured to be installed in the server 80 which is in communication with the base station 10 and the rover 20, while the calibration apparatus 70 is configured to be coupled with the rover 20 so as to communicate with the second GNSS receiver 24, as shown in FIG. 7. In addition, similarly to the previous embodiments, the system 160 may further include the database 56 provided in the server 80, such that a plurality of different makes, types, models, and/or versions for the second GNSS receiver 24 in the rover 20 can be managed.

In this implementation, information on all of the GNSS receivers which are possibly used for the base station-side GNSS receiver (the first GNSS receiver 14) and/or the rover-side GNSS receiver (the second GNSS receiver 24), such as makes, types, models, and firmware versions, may be registered to the server 80, and stored in the calibration memory 50 in the server 80 with corresponding calibration information 54 for each base-rover combination. The calibration information 54 and/or the data base 56 can be updated as needed when new information becomes available though measurement, or new GNSS receivers become available, as described above.

In such an implementation in which the system 160 is customized to a specific second GNSS receiver 24, the calibration table 52 (calibration parameters) in the calibration memory 50 can be simplified to contain calibration information 54 for the specific GNSS second receiver only, with respect to a plurality of base station-side GNSS receivers. In addition, the database 56 can be omitted in such a customized implementation, and the rover 20 does not send the GNSS receiver information 44 to the server 80.

As shown in FIG. 7, the base station 10 sends the first correction signal 40 to the server 80, and the memory processor 60 retrieves the calibration information 54 (calibration parameters) for the specific GNSS receiver 24 based on the identification information of the first GNSS receiver 14 indicated in the first correction signal 40. In this embodiment, the memory processor 60 (the server 80) transmits the received first correction signal 40 and the retrieved calibration information 54 (calibration parameters) to the rover 20. It should be noted that in this embodiment, the server 80 does not change the first correction signal 40, but simply forwards the first correction signal 40 together with the retrieved calibration information 54 to the rover 20. The retrieved calibration information 54 may be assigned to certain data field in an RTCM message.

At the rover 20, the calibration apparatus 70 receives the first correction signal 40 and the calibration information 54, and modifies the first error correction information in the received first correction signal 40 with the received calibration information 54 into modified correction information, thereby generating a modified correction signal 42, in a similar manner as the calibration apparatus 70 in the systems 100, 120, or 140 in the previous embodiments. The calibration apparatus 70 may be implemented, for example, in a communication board (or a circuit board for communication) of the rover 20.

The second GNSS receiver 24 receives the modified correction signal 42 from the calibration apparatus 70, and performs the RTK positioning the frequency-dependent hardware bias calibration using the modified correction information.

Figure 8:
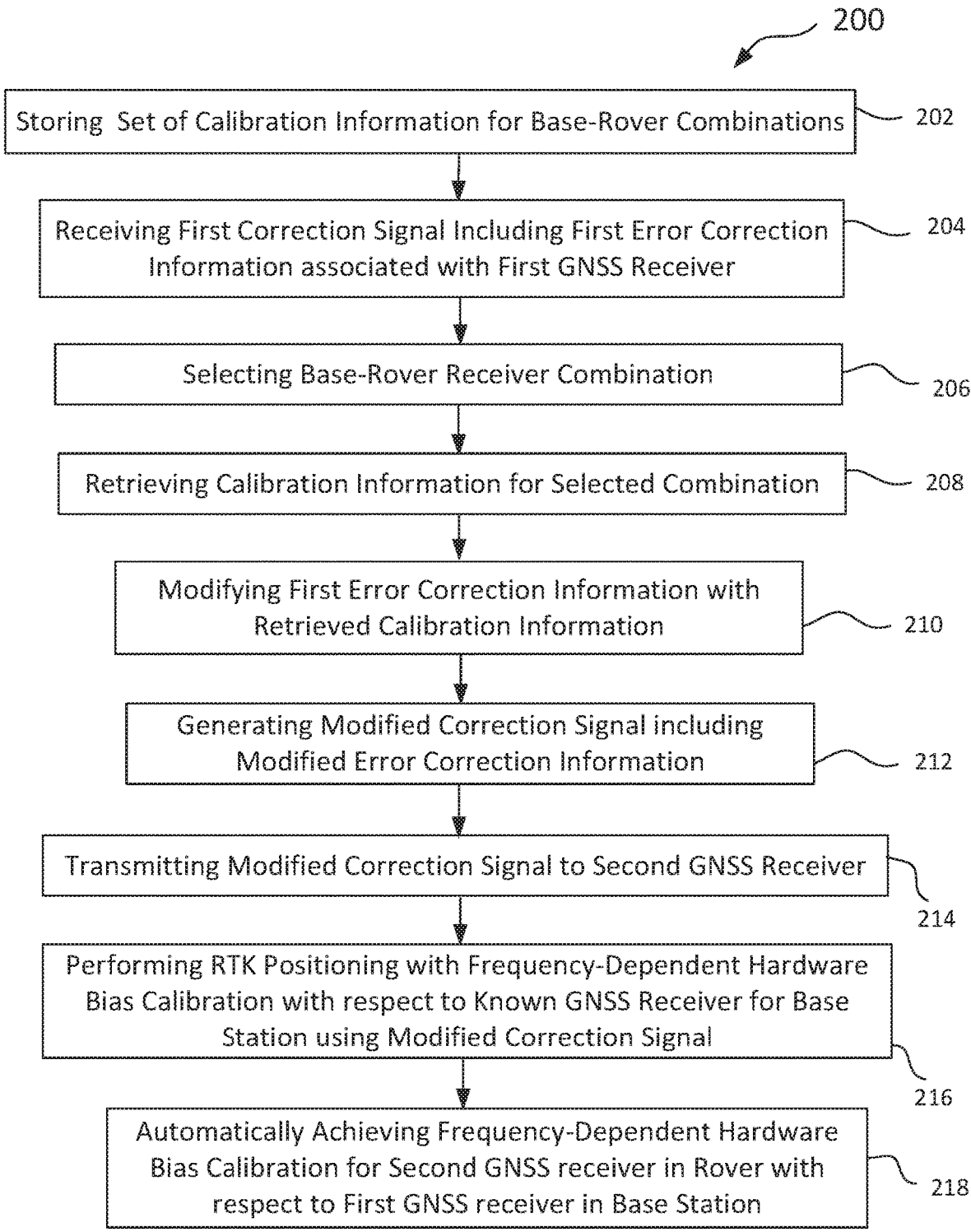
FIG. 8 is a process flow diagram illustrating a method for generating a correction signal for RTK positioning with a frequency-dependent hardware bias calibration between a base station and a rover, in accordance with one embodiment of the present invention.

In another aspect of the invention, embodiments of the present invention provides a method 200 for generating a correction signal for RTK positioning with a frequency-dependent hardware bias calibration between a base station and a rover, as shown in FIG. 8. The base station includes a first GNSS receiver and a first antenna, and the rover includes a second GNSS receiver and a second antenna. In the RTK positioning, a plurality of GNSS signals including GLONASS signals may be received by the base station and the rover. The method may be performed by any one of the systems 100, 120, 140, and 160 described above, which includes a calibration memory, a memory processor, and a calibration apparatus.

As shown in FIG. 8, the method 200 includes storing a set of calibration information for base-rover combinations between a plurality of GNSS receivers for the base station and at least one GNSS receiver for the rover (202). In accordance with one embodiment of the present invention, the set of calibration information may include at least one of a calibration table and a set of calibration coefficients. For example, the calibration table includes measured calibration values for the frequency-dependent hardware bias with respect to the base-rover combinations. The set of calibration coefficients may be used for linear approximation of the frequency-dependent hardware bias with respect to frequency numbers of GLONASS satellites. The calibration information may be stored in the calibration memory. Thus, the storing a set of calibration information (202) may also be realized by providing such a calibration memory which stores the set of calibration information. The calibration memory may be implemented in a server which is in communication with the base station and the rover, or implemented in the base station.

A first correction signal including first error correction information associated with the first GNSS receiver is received (204). The first correction signal may be sent by the rover and received by the processor memory and/or the calibration apparatus. A base-rover combination of the first GNSS receiver (for the base station) and a second GNSS receiver (for the rover) is selected based on the first correction signal which includes identification information (GNSS receiver information) of the first GNSS receiver (206). This selection may be performed by the memory processor which determines the base-rover combination in accordance with the identification information of the first GNSS receiver (to determine the base station-side receiver), and identification information of the second GNSS receiver (to determine the rover-side receiver). When the method 200 is customized for a specific second GNSS receiver for the rover, as the second GNSS receiver is already known, the selecting the combination is the same as selecting the first GNSS receiver as the base station-side receiver. On the other hand, if the method 200 is managing a plurality of different rover-side receivers, the second GNSS receiver is determined based on the identification information (GNSS receiver information) sent from the rover. A database containing rover-side GNSS receiver information may be used in order to identify the second GNSS receiver as the rover-side receiver.

The calibration information (calibration parameters) for the selected combination is retrieved from the calibration memory (208). The retrieval of the calibration information may be performed by the memory processor. The retrieved calibration information is provided to the calibration apparatus. The first error correction information is modified with the retrieved calibration information using the calibration apparatus (210) thereby generating a modified correction signal including modified error correction information calibrated for the second GNSS receiver with respect to the first GNSS receiver (212). The modified correction signal is transmitted to the second GNSS receiver in the rover (214), which allows the rover (the second GNSS receiver) to perform the RTK positioning with frequency-dependent hardware bias calibration with respect to a known GNSS receiver of the base station using the modified correction signal (216). As a result, the frequency-dependent hardware bias calibration for the second GNSS receiver in the rover is automatically achieved with respect to the first GNSS receiver in the base station (218).

In order to perform RTK positioning using GLONASS signals, a rover may have been provided with a calibration table or the like to compensate frequency-dependent hardware bias for known GNSS receivers in a base station. However, there may be such a situation in which at least one of a make, type, model, and firmware version of the actual GNSS receiver (the first GNSS receiver) in the base station is different from that of the known GNSS receivers. Thus, when the rover receives the first correction signal from the base station, the second GNSS receiver of the rover may not recognize the first GNSS receiver. For example, the second GNSS receiver may not be able to find calibration information for the first GNSS receiver in the calibration table. Accordingly, the modified error correction information in accordance with one embodiment of the present invention may include (i) identification information of a known GNSS receiver recognizable to the second GNSS receiver, and (ii) modified parameter values which produces correct frequency-dependent hardware bias calibration with respect to the first GNSS receiver when used by the second GNSS receiver in a calibration process with respect to the known GNSS receiver.

When the method 200 is customized to a specific second GNSS receiver for the rover in accordance with one embodiment of the present invention, the identification information of the known GNSS receiver in the modified correction signal may be the same as the identification information of the second GNSS receiver itself. The second GNSS receiver in the rover can perform the RTK positioning as if it is performed with respect to the same (i.e., known) GNSS receiver. Using the modified parameter values for the first GNSS receiver—the second GNSS receiver combination, the wavelength-dependent hardware bias calibration with respect to the (unknown) first GNSS receiver is automatically achieved in the second GNSS receiver.

In another situation, the first GNSS receiver of the base station may be one of a plurality of known GNSS receivers recognized by the second GNSS receiver, while the first GNSS receiver has hardware characteristics unknown to the second GNSS receiver, or the actual hardware characteristics are different from that which are known to the second GNSS receiver. The hardware characteristics may depend on at least one of type, model, and firmware version of the first GNSS receiver. For example, if the rover identifies the first GNSS receiver in the base station by the make and model thereof, while the hardware characteristics are different among firmware versions, then the rover (the second GNSS receiver) will not be able to properly perform the hardware calibration based on the identification of the first GNSS receiver.

Accordingly, the modified error correction information in accordance with one embodiment of the present invention may include (i) identification information of the first GNSS receiver known to the second GNSS receiver, and (ii) modified parameter values which reflect or otherwise compensate changes in the hardware characteristics. The modified parameter values are configured to produce correct frequency-dependent hardware bias calibration with respect to the first GNSS receiver having different hardware characteristics unknown to the second GNSS receiver, when used by the second GNSS receiver in a calibration process with respect to the first GNSS receiver having the hardware characteristics known to the second GNSS receiver.

In accordance with one embodiment of the present invention, the steps of storing (202), receiving (204), selecting (206), retrieving (208), modifying (210), generating (212), and transmitting (214) may be performed in a server which is in communication with the base station and the rover, while the steps of performing RTK positioning (216) and automatically achieving (218) may be performed in the rover.

In accordance with another embodiment of the present invention, the steps of storing (202), receiving (204), selecting (206), retrieving (208), modifying (210), generating (212), and transmitting (214) may be performed in the base station, while the steps of performing RTK positioning (216) and automatically achieving (218) may be performed by the rover.

Figure 9:
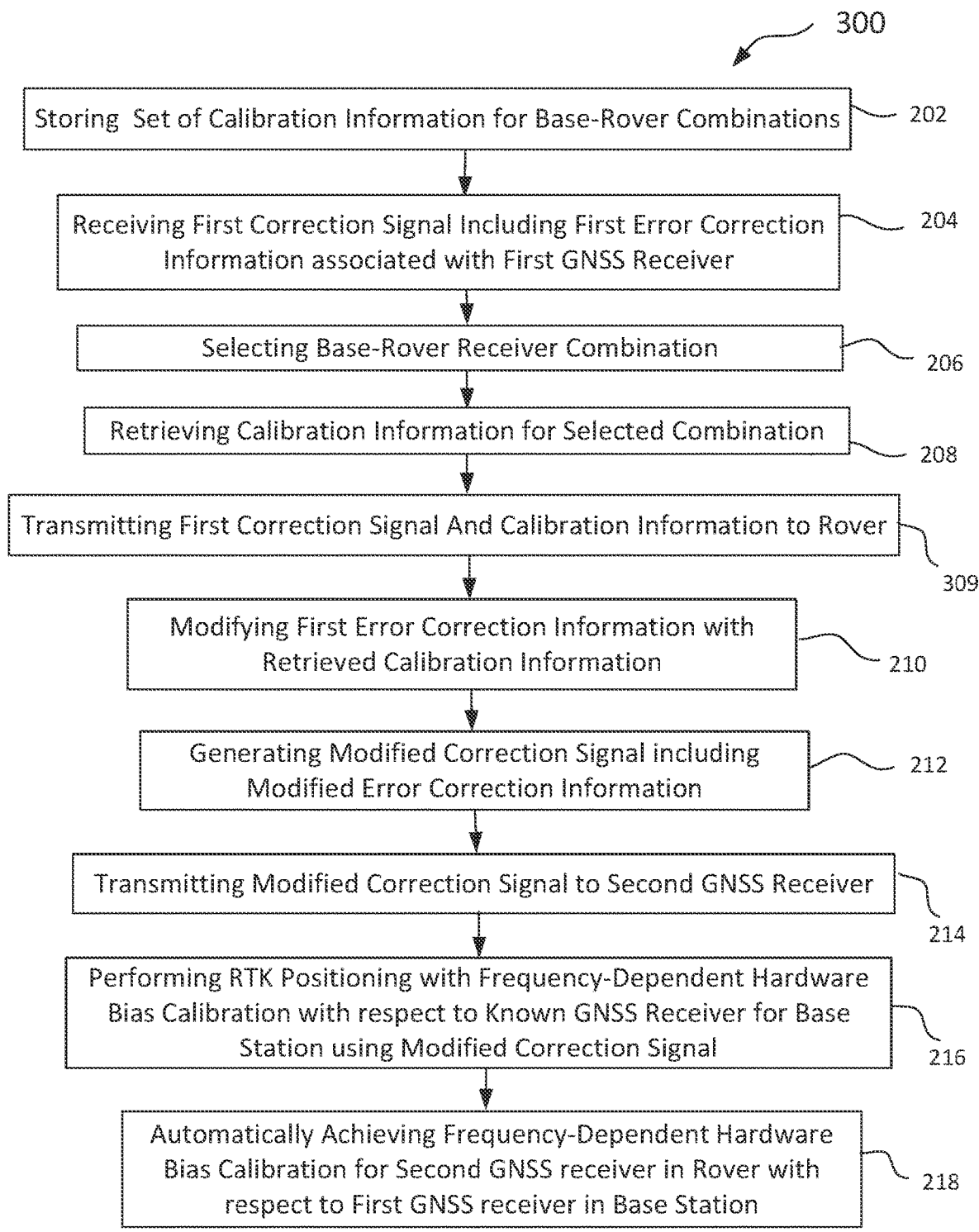
FIG. 9 is a process flow diagram illustrating a method for generating a correction signal for RTK positioning with a frequency-dependent hardware bias calibration between a base station and a rover, in accordance with another embodiment of the present invention.

FIG. 9 shows another method 300 in accordance with yet another embodiment of the present invention, in which the steps of storing (202), receiving (204), selecting (206), and retrieving (208) are performed in a server in communication with the base station and the rover. The method 300 further includes transmitting the received first correction signal and the retrieved calibration information from the server to the rover (309), while the modifying (210) and generating (212) may be performed in a calibration apparatus provided to the rover. The calibration apparatus transmits or otherwise provides the modified correction signal to the second GNSS receiver (214), and the second GNSS receiver performs the RTK positioning (216) and the frequency-dependent hardware bias calibration (218).

Figure 10:
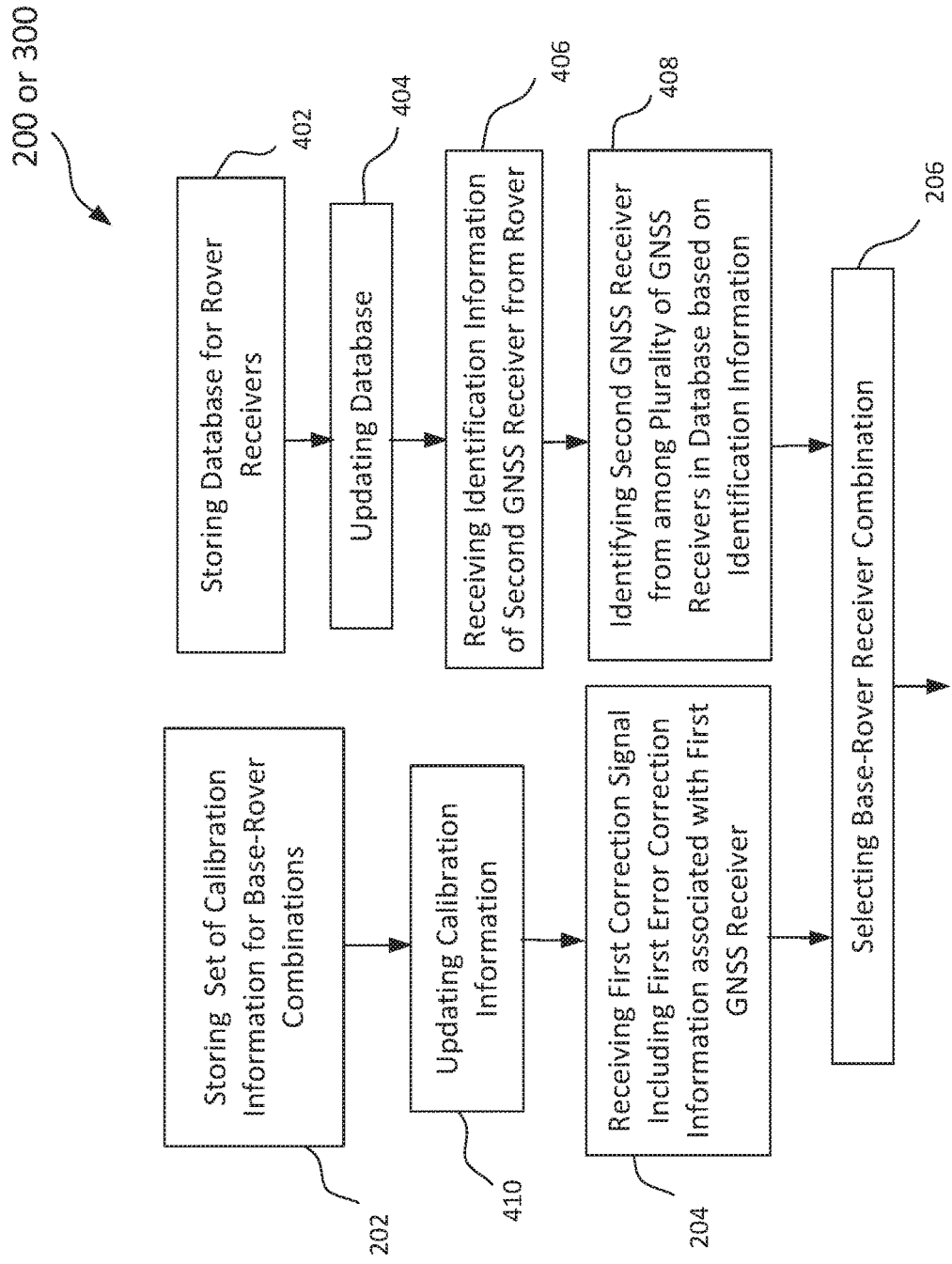
FIG. 10 is a process flow diagram illustrating additional steps for the method of FIG. 8 and/or FIG. 9 in accordance with one embodiment of the present invention.

In accordance with one embodiment of the present invention, the method 200 and/or 300 described above may manage a plurality of different rover-side receivers (second GNSS receivers) as shown in FIG. 10. Thus, the method 200 and 300, respectively, may further include, prior to selecting base-rover receiver combination (206), and preferably at the same time as storing the set of calibration information (202), providing a database associated with the set of calibration information (402), where the database stores information of a plurality of GNSS receivers for the rover. The database may be updated when one or more new rover-side receivers (second GNSS receivers) become available (404). The method 200 or 300 may further include receiving from the rover identification information of the second GNSS receiver (406), and identifying the second GNSS receiver from among the plurality of GNSS receivers in the database based on the identification information (408), prior to selecting the combination of the first GNSS receiver and the second GNSS receiver (206), as shown in FIG. 10. In addition, the method 200 and/or 300 may further include updating the set of calibration information stored in the memory with updated calibration information or new calibration information for a new base-rover combination (410), as shown in FIG. 10. The subsequent process steps are the same as that shown in FIG. 7 (for the method 200) or FIG. 8 (for the method 300).

EXAMPLE

As an example of implementation, GLONASS RTCM Multiple Signal Messages (MSM) may be used for the base-rover RTK positioning. The MSM identifies GNSS satellites and their signals, and provides information of GNSS observables such as Pseudo Range, Phase Range, and Phase Range Rate (Doppler), with rough-range, and fine-range. Currently MSM1 to MSM7 are defined, which present the same data (observables) with different level of details. For example, MSM6 and MSM7 have the same contents as MSM4 and MSM5, respectively, but with some fields presented with finer resolutions and/or wider range, as is well known to those of ordinary skill in the art.

The first GNSS receiver 14 in a base station 10 may transmit the first correction signal 40 in the RTCM v.3x format (for example, RTCM v.3.2) with MSM5. Suppose that the second GNSS receiver 24 in a rover 20 does not know the first GNSS receiver 14 but recognizes a third GNSS receiver ("known GNSS receiver") which may be a widely-used GNSS receiver of a major make, for example.

In this example of implementation, the GLONASS signals in the frequency bands L1 and L2 are used. Suppose the GLONASS signal with the frequency number k in the frequency band L1 has frequency $f_{L1}^k$, and that in the frequency band L2 has frequency $f_{L2}^k$. The frequency number k is denoted as −7 to 6, which may also be denoted as 0 to 13 in a different notation system. It should be noted that each GLONASS satellite is assigned with a unique slot number (1 though 24) which also identifies one of the frequency numbers k assigned thereto in each frequency band (L1 and L2). Table 1 below shows the correspondence between the slot number and the assigned frequency number.

TABLE 1

| Slot No. | GLONASS Frequency No. | Slot No. | GLONASS Frequency No. | Slot No. | GLONASS Frequency No. |
|---|---|---|---|---|---|
| R01 | 1 | R09 | −2 | R17 | 4 |
| R02 | −4 | R10 | −7 | R18 | −3 |
| R03 | 5 | R11 | 0 | R19 | 3 |
| R04 | 6 | R12 | −1 | R20 | 2 |
| R05 | 1 | R13 | −4 | R21 | 4 |
| R06 | −4 | R14 | −7 | R22 | −3 |
| R07 | 5 | R15 | 0 | R23 | 3 |
| R08 | 6 | R16 | −1 | R24 | 2 |

In the RTCM v.3.2, MSM5 format, the GNSS signal fine Phase Range data, which corresponds to the hardware bias, is the value to be modified among the values used for the precise point positioning. The fine Phase Range data is expressed in the unit of $2^{-29}$ ms (milliseconds). Suppose the original values of the fine Phase Range data before modification are $\psi_{L1}^k$, $\psi_{L2}^k$, and the corresponding modified values are $\Phi_{L1}^k$, $\Phi_{L2}^k$ for the GLONASS signals with the frequency number k in the frequency bands L1 and L2, respectively.

Suppose that a difference in hardware bias between the first GNSS receiver 14 and the known GNSS receiver for the GLONASS signal with the frequency number k in the frequency band L1 is $\Delta\phi_{L1}^k$, and that in the frequency band L2 is $\Delta\phi_{L2}^k$. The hardware bias differences $\Delta\phi_{L1}^k$, $\Delta\phi_{L1}^k$ are measured in cycles (the number of cycles). Then, the modified values $\Phi_{L1}^k$, $\Phi_{L2}^k$ are expressed as follows:

$$\Phi_{L1}^k = \psi_{L1}^k - \frac{\Delta\phi_{L1}^k}{2^{-29} \times 0.001 \times f_{L1}^k} = \psi_{L1}^k - \frac{2^{29} \times 10^3 \times \Delta\phi_{L1}^k}{f_{L1}^k}$$

$$\Phi_{L2}^k = \psi_{L2}^k - \frac{\Delta\phi_{L2}^k}{2^{-29} \times 0.001 \times f_{L2}^k} = \psi_{L2}^k - \frac{2^{29} \times 10^3 \times \Delta\phi_{L2}^k}{f_{L2}^k}$$

Table 2 below shows an example of the hardware bias between the first GNSS receiver 14 and the known GNSS receiver for the GLONASS signal with the frequency number k in the frequency bands L1 and L2 $\Delta\phi_{L1}^k$ and $\Delta\phi_{L2}^k$. The hardware bias values can be obtained by measurement, or by receiving the date from the manufacture of the GNSS receivers.

TABLE 2

| | GLONASS Frequency Number | | | | | | |
|---|---|---|---|---|---|---|---|
| k | −7 | −6 | −5 | −4 | −3 | −2 | −1 |
| Hardware Bias for L1 $\Delta\phi_{L1}^k$ | −0.1754 | −0.1507 | −0.126 | −0.106 | −0.0749 | −0.0462 | −0.0254 |
| Hardware Bias for L2 $\Delta\phi_{L2}^k$ | −0.1432 | −0.1229 | −0.1026 | −0.0815 | −0.0628 | −0.0357 | −0.0224 |
| k | 0 | 1 | 2 | 3 | 4 | 5 | 6 |
| Hardware Bias for L1 $\Delta\phi_{L1}^k$ | 0 | 0.0213 | 0.0483 | 0.073 | 0.0946 | 0.1278 | 0.1507 |
| Hardware Bias for L2 $\Delta\phi_{L2}^k$ | 0 | 0.0175 | 0.086 | 0.0793 | 0.0726 | 0.0927 | 0.1099 |

In a case where the rover 20 (or the second GNSS receiver 24 therein) is provided with a similar calibration table for the first GNSS receiver 14, the rover 20 would be able to perform the RTK positioning with a proper hardware bias calibration. However, in such a case as this in which the first GNSS receiver 14 is unknown to the second GNSS receiver 24 and/or the rover 20 does not have a calibration table for the first GNSS receiver 14, the RTK position cannot be performed satisfactory. The embodiments of the present invention provide an effective solution to such a case, allowing the rover 20 to perform the RTK positioning with respect to the base station 10 even when the first GNSS receiver 14 is unknown or the rover 20 does not have a calibration table.

For example, suppose the first GNSS receiver 14 receives the GLONASS signals L1 and L2 from a specific GLONASS satellite with a slot number 20, which has the GLONASS frequency number 2 (see Table 1), and the first correction signal 40 includes the original (unmodified) fine Phase Range data values $\psi_{L1}{}^k$, $\psi_{L2}{}^k$ as the correction information, where $\psi_{L1}{}^k = -170255$, and $\psi_{L2}{}^k = 126557$ in the unit of $2^{-29}$ ms.

Using the equations mentioned above, $$-170255 - \frac{2^{29} \times 10^3 \times 0.0483}{1.246 \times 10^9 + 4.375 \times 10^5 \times 2} \approx -170271$$

$$126557 - \frac{2^{29} \times 10^3 \times 0.086}{1.602 \times 10^9 + 5.625 \times 10^5 \times 2} \approx 126520$$

where the frequencies in the denominators are calculated as follows:

$f_{L1}{}^k = 1.602 \times 10^9 + 5.625 \times 10^5 \times k$ $f_{L2}{}^k = 1.246 \times 10^9 + 4.375 \times 10^5 \times k$ Thus, in the modified correction signal 42, the values of the fine Phase Range data for the frequency bands L1 and L2 are changed to −170271 (instead of −170255) and 126520 (instead of 126557), respectively, and the identification (name) of the first GNSS receiver 14 is changed to that of the known GNSS receiver. The rover 20 (the second GNSS receiver 24) receives the modified correction signal 42 and performs the RTK positioning with the hardware bias calibration with respect to the known GNSS receiver using the modified correction information (i.e., the modified values), thereby achieving the actual hardware bias calibration with respect to the first GNSS receiver 14 in the base station.

It should be noted that the numbers and values described above are illustrative examples, and thus not limited to these specific numbers and values.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A system for generating a correction signal for RTK positioning with a frequency-dependent hardware bias calibration between a base station and a rover, the system comprising:
   a calibration memory that stores a set of calibration information for base-rover combinations between a plurality of GNSS receivers for the base station and at least one GNSS receiver for the rover;
   a memory processor configured to retrieve the calibration information for a selected base-rover combination of a first GNSS receiver for the base station and a second GNSS receiver for the rover from the calibration memory; and
   a calibration apparatus in communication with the rover and the memory processor, the calibration apparatus being configured to receive a first correction signal including first error correction information associated with the first GNSS receiver, obtain the calibration information selected by the memory processor based on the first correction signal, modify the first error correction information with the selected calibration information to generate a modified correction signal including modified error correction information calibrated for the second GNSS receiver with respect to the first GNSS receiver, and transmit the modified correction signal to the rover,
   wherein the rover performs the RTK positioning with respect to a known GNSS receiver for the base station using the modified correction signal, thereby automatically achieving the frequency-dependent hardware bias calibration for the second GNSS receiver with respect to the first GNSS receiver.

2. The system according to claim 1, wherein at least one of a make, type, model, and firmware version of the first GNSS receiver is different from that of the known GNSS receiver.

3. The system according to claim 1, wherein the second GNSS receiver does not recognize the first GNSS receiver, the modified error correction information including:
   identification information of the known GNSS receiver; and
   modified parameter values configured to produce correct frequency-dependent hardware bias calibration with respect to the first GNSS receiver when used by the second GNSS receiver in a calibration process with respect to the known GNSS receiver.

4. The system according to claim 1, wherein the first GNSS receiver is one of a plurality of known GNSS receivers recognized by the second GNSS receiver, while the first GNSS receiver having hardware characteristics unknown to the second GNSS receiver, the modified error correction information including:
   identification information of the first GNSS receiver having known hardware characteristics; and
   modified parameter values configured to produce correct frequency-dependent hardware bias calibration with respect to the first GNSS receiver when used by the second GNSS receiver in a calibration process with respect to the first GNSS receiver having the known hardware characteristics.

5. The system according to claim 4, wherein the hardware characteristics depend on at least one of type, model, and firmware version of the first GNSS receiver.

6. The system according to claim 1, wherein the calibration memory, the memory processor, and the calibration apparatus are configured to be installed in a server which is in communication with the base station and the rover.

7. The system according to claim 1, wherein the calibration memory, the memory processor, and the calibration apparatus are configured to be installed in the base station.

8. The system according to claim 1, wherein the calibration memory and the memory processor are configured to be installed in a server which is in communication with the base station and the rover, while the calibration apparatus is configured to be coupled with the rover so as to communicate with the second GNSS receiver.

9. The system according to claim 1, wherein the first GNSS receiver and the second GNSS receiver respectively receive a plurality of GNSS signals including GLONASS signals.

10. The system according to claim 9, wherein the set of calibration information includes at least one of:
   a calibration table of measured calibration values for the frequency-dependent hardware bias with respect to the base-rover combinations; and
   a set of calibration coefficients for linear approximation of the frequency-dependent hardware bias with respect to frequency numbers of GLONASS satellites.

11. The system according to claim 1, wherein the rover is configured to transmit identification information of the second GNSS receiver thereof to the memory processor, the system further comprising:
   a database coupled with the memory processor, the database storing information of a plurality of GNSS receivers for the rover,
   and wherein the memory processor is further configured to identify the second GNSS receiver from among the plurality of GNSS receivers for the rover in the database based on the identification information, thereby selecting the combination of the first GNSS receiver and the second GNSS receiver for the calibration memory.

12. The system according to claim 1, wherein the memory processor is further configured to update the calibration memory with updated calibration information or new calibration information for a new base-rover combination.

13. A method for generating a correction signal for RTK positioning with a frequency-dependent hardware bias calibration between a base station having a first GNSS receiver and a rover having a second GNSS receiver, the method comprising:
   storing a set of calibration information for base-rover combinations between a plurality of GNSS receivers for the base station and at least one GNSS receiver for the rover;
   receiving a first correction signal including first error correction information associated with the first GNSS receiver;
   selecting a base-rover combination of the first GNSS receiver for the base station and the second GNSS receiver for the rover based on the first correction signal;
   retrieving the calibration information for the selected base-rover combination from the stored set of calibration information;
   modifying the first error correction information with the retrieved calibration information into modified error correction information calibrated for the second GNSS receiver with respect to the first GNSS receiver;
   generating a modified correction signal including the modified error correction information;
   transmitting the modified correction signal to the second GNSS receiver in the rover; and
   allowing the rover to perform the RTK positioning with respect to a known GNSS receiver for the base station using the modified correction signal, thereby automatically achieving the frequency-dependent hardware bias calibration for the second GNSS receiver in the rover with respect to the first GNSS receiver in the base station.

14. The method according to claim 13, wherein at least one of a make, type, model, and firmware version of the first GNSS receiver is different from that of the known GNSS receiver.

15. The method according to claim 13,
   wherein the second GNSS receiver does not recognize the first GNSS receiver,
   and wherein the modified error correction information includes:
      identification information of the known GNSS receiver; and
      modified parameter values which produce correct frequency-dependent hardware bias calibration with respect to the first GNSS receiver when used by the second GNSS receiver in a calibration process with respect to the known GNSS receiver.

16. The method according to claim 13,
   wherein the first GNSS receiver is one of a plurality of known GNSS receivers recognized by the second GNSS receiver, while the first GNSS receiver having different hardware characteristics unknown to the second GNSS receiver,
   and wherein the modified error correction information includes:
      identification information of the first GNSS receiver known to the second GNSS receiver; and
      modified parameter values configured to produce correct frequency-dependent hardware bias calibration with respect to the first GNSS receiver having the different hardware characteristics unknown to the second GNSS receiver when used by the second GNSS receiver in a calibration process with respect to the first GNSS receiver having the hardware characteristics known to the second GNSS receiver.

17. The method according to claim 16, wherein the hardware characteristics depend on at least one of type, model, and firmware version of the first GNSS receiver.

18. The method according to claim 13, wherein the storing, the receiving, the selecting, the retrieving, the modifying, the generating, and the transmitting are performed in a server which is in communication with the base station and the rover.

19. The method according to claim 13, wherein the storing, the receiving, the selecting, the retrieving, the modifying, the generating, and the transmitting are performed in the base station.

20. The method according to claim 13, wherein the storing, the receiving, the selecting, and the retrieving are performed in a server which is in communication with the base station and the rover, the method further comprising:
   transmitting the received first correction signal and the retrieved calibration information to the rover,
   wherein the modifying, the generating, and the transmitting are performed in a calibration apparatus provided to the rover, the calibration apparatus communicating with the GNSS receiver of the rover.

21. The method according to claim 13, wherein the performing the RTK positioning includes:
   receiving a plurality of GNSS signals including GLONASS signals.

22. The method according to claim 21, wherein the set of calibration information includes at least one of:

a calibration table of measured calibration values for the frequency-dependent hardware bias with respect to the base-rover combinations; and a set of calibration coefficients for linear approximation of the frequency-dependent hardware bias with respect to frequency numbers of GLONASS satellites.

23. The method according to claim 13, further comprising:

providing a database associated with the set of calibration information, the database storing information of a plurality of GNSS receivers for the rover;

receiving identification information of the second GNSS receiver from the rover; and identifying the second GNSS receiver from among the plurality of GNSS receivers in the database based on the identification information, thereby selecting the combination of the first GNSS receiver and the second GNSS receiver.

24. The method according to claim 13, further comprising:

updating the set of calibration information memory with updated calibration information or new calibration information for a new base-rover combination.

\* \* \* \* \*